United States Patent [19]

Cheng

[11] 4,327,069
[45] Apr. 27, 1982

[54] PROCESS FOR MAKING CARBON BLACK

[75] Inventor: Paul J. Cheng, Bartlesville, Okla.

[73] Assignee: Phillips Petroleum Company, Bartlesville, Okla.

[21] Appl. No.: 163,006

[22] Filed: Jun. 25, 1980

[51] Int. Cl.³ .................. C01B 31/02; C09C 1/48
[52] U.S. Cl. ...................... 423/450; 423/449
[58] Field of Search ............ 423/449, 450, 455, 456; 422/150

[56] References Cited

U.S. PATENT DOCUMENTS

| | | | |
|---|---|---|---|
| 2,616,794 | 11/1952 | Krejci | 23/209.6 |
| 3,010,794 | 11/1961 | Friauf et al. | 23/209.4 |
| 3,117,016 | 1/1964 | Smith | 106/307 |
| 3,460,911 | 8/1969 | Krejci et al. | 23/259.5 |
| 3,490,869 | 1/1970 | Heller | 23/209.4 |
| 3,619,138 | 11/1971 | Gunnell | 23/209.4 |
| 3,721,529 | 3/1973 | Kraus | 23/259.5 |
| 3,877,876 | 4/1975 | Cheng | 23/259.5 |
| 3,986,836 | 10/1976 | Cheng | 23/259.5 |
| 4,051,135 | 9/1977 | Vanderveen | 23/259.5 |
| 4,058,590 | 11/1977 | Roble | 423/449 |
| 4,071,496 | 1/1978 | Kraus et al. | 260/42.36 |

Primary Examiner—O. R. Vertiz
Assistant Examiner—Gregory A. Heller

[57] ABSTRACT

Two carbon black reactors in sequence, one being a high-structure carbon black reactor, the other being a low structure carbon black reactor, one feeding into the other, yield low tint residual carbon black.

7 Claims, 1 Drawing Figure

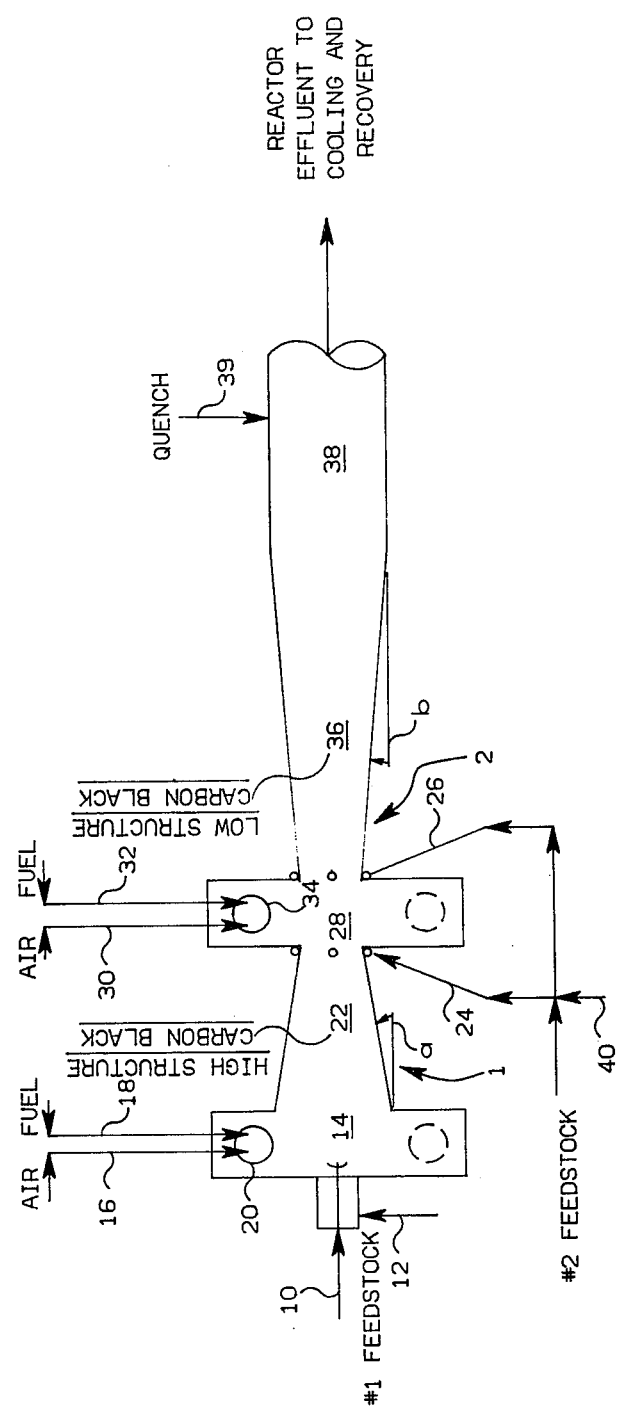

PROCESS FOR MAKING CARBON BLACK

This invention relates to a process for producing low tint residual carbon black. More specifically, this invention relates to a process and apparatus for the production of a carbon black having a negative tint residual.

BACKGROUND OF THE INVENTION

It is known from the art that carbon blacks having a negative tint residual of about −5 or less exhibit advantageous properties when used in rubber reinforcement. Specifically, such blacks reduce the hysteresis of the carbon black/rubber composition. Thus, the heat buildup in a rubber composition containing such a low tint residual carbon black is less than that of a similar rubber composition containing a carbon black with a higher tint residual. Such blacks also reduce the rolling resistance of the tires. Thus, the vehicle fuel efficiency is improved. It remains a continuing goal in the carbon black industry to provide new processes and apparatus for producing specialty carbon blacks, in particular low tint residual carbon blacks.

THE INVENTION

It is thus one object of this invention to provide a process for producing carbon black having a low tint residual.

Another object of this invention is to provide a process for producing low tint residual carbon black which allows the modification of carbon black properties readily while maintaining the low tint residual value.

Still another object of this invention is to provide a carbon black furnace permitting the production of low tint residual carbon black.

These and other objects, advantages, details, features, and embodiments of this invention will become apparent to those skilled in the art from the following detailed description of the invention, the appended claims and the drawing which shows a schematic cross section through a carbon black furnace in accordance with this invention.

In accordance with this invention there is provided a process for the production of carbon black of low tint residual which can be described as a double carbon black process comprising a first and a second carbon black process in series wherein the first carbon black cotaining smoke from the first carbon black formation stage is introduced into a second carbon black formation stage in which additional hot combustion gases and hydrocarbon feedstock materials are introduced with the provision that the process parameters of the first stage and the process parameters of the second stage are so significantly different that in one stage a high structure carbon black is formed whereas in the other stage a low structure carbon black is formed.

In accordance with a first embodiment of this invention therefore, a process for producing carbon black of low tint residue is provided. In this process, a first flow of hot combustion gases formed by the combustion of a first fuel stream and a first oxygen containing stream is established in a first carbon black forming zone. Into this first carbon black forming zone and into admixture with the first hot combustion gases a first stream of hydrocarbon feedstock is introduced. Thereby, a first carbon black forming mixture is generated in which at least a portion fo the first stream of hydrocarbon feedstock is converted to carbon black. This first carbon black forming mixture is passed from the first carbon black forming zone under carbon black formation conditions into a second carbon black forming zone of the furnace used. This second carbon black forming zone is in an open connection and fluid communication with the first carbon black forming zone. A second flow of hot combustion gases formed by the combustion of a second fuel stream and a second oxygen containing stream is established in the second carbon black forming zone. A second stream of hydrocarbon feedstock is introduced into the second carbon black forming zone of the furnace and into admixture with the second flow of hot combustion gases established therein as well as with the first carbon black forming mixture coming from the first carbon black forming zone of the furnace. The operating parameters in the first and second carbon black forming zones are such that in one of the carbon black forming zones which is a high structure zone there is formed a high structure carbon black, whereas in the other of the carbon black forming zones which is a low structure zone there is formed a low structure carbon black. In the second carbon black forming zone of the furnace a second carbon black forming mixture is generated which is passed from this second carbon black forming zone under carbon black forming conditions into a quench zone. In this quench zone the second carbon black forming mixture (which contains the mass from the first carbon black forming zone) is contacted with a quench fluid to produce a carbon black containing smoke at a temperature of below carbon black formation conditions. Finally, the carbon black of low tint residue is separated from the smoke as the product of the process.

The difference in operating conditions in the two carbon black forming zones of the furnace can be achieved by applying various means. The high structure carbon black generally will be produced by using one or more of the following conditions: A highly aromatic feedstock as compared to the feedstock used in the low structure zone may be used. The aromaticity of the feedstock is best defined by reference to the BMCI.

BMCI (BUREAU OF MINES CORRLATION INDEX)

BMCI = 48,640/K + 473.7G − 456.8
K = Ave. Boiling Point, °K.
G = Specific Gravity @60° F.

Another method of achieving high structure carbon black is the use of an envelope stream containing free oxygen surrounding the hydrocarbon feedstock stream entering the high structure zone. Conversely, one or more of the following conditions enhance the production of low structure carbon black: the feedstock introduced into the low structure can be a feedstock of lesser aromaticity than feedstock used in the high structure zone. Again, the low aromaticity is best defined with reference to the BMCI of the feedstock. Another method of achieving low structure of the carbon black in the low structure zone is to introduce an alkali metal compound.

More specifically, the high structure differential between the carbon black formed in the high structure zone and the carbon black formed in the low structure zone can be achieved by using a highly aromatic feedstock in the high structure zone and a low aromaticity feedstock in the low structure zone so that the difference in the BMCI values of the feedstocks is preferably at least 20. The preferred highly aromatic feedstock for the high structure zone has a BMCI of at least 120, and particularly of 120-150. The oils that are commercially available today for production of high structure carbon black usually have BMCI in the range of 120-130. Conversely, the feedstocks for producing the carbon black with a low structure will generally have a BMCI of 100 or less. A practical range for these low BMCI feedstocks is 60-100.

A further preferred means for achieving high structure in the carbon black of the high structure zone is to introduce a significant portion of the total oxygen used in the high structure zone in a gas stream surrounding the hydrocarbon feedstream. Up to 70 percent of the total oxygen utilized in the high structure zone can be introduced in the form of such a blanketing or enveloping stream. Generally, the quantity of oxygen surrounding the hydrocarbon feedstream introduced will be 10-70 percent of the total oxygen charged tangentially and axially to the high structure zone of the furnace. Air, oxygen-enriched air, or oxygen can be added as this enveloping stream.

The use of alkali metal compound for the control of (decrease in) structure and particularly for the production of low structure carbon black is as such well known in the art, see for instance U.S. Pat. Nos. 3,010,794 and 3,010,795. The disclosure with respect to the alkali metals and the quantities in which these alkali metals can be employed is herewith incorporated by reference. Preferably, a potassium compound is used as the structure reducing agent in the low structure zone. The quantity of "potassium" preferably is 10 ppm or more by weight of "potassium" based on the hydrocarbon feedstock introduced into the high structure zone.

Whereas it is possible to carry out the process of this invention by producing the low structure carbon black in the first zone and the high structure carbon black in the second zone, it is presently preferred to reverse this order. Thus, in the preferred embodiment, the first carbon black forming zone is the high structure zone and the second carbon black forming zone is the low structure zone. Best results are expected when in this arrangement the feedstock in the first carbon black forming zone is a high BMCI oil and the feedstock in the second carbon black forming zone is a low BMCI oil. The most preferred embodiment of this invention utilizes oxygen as the sheath or blanket stream as descibed above in the first zone also and also employs the addition of alkali metal as described in the second carbon black forming zone.

It is significant to note that no quench occurs (no quench is added externally) between the first and the second carbon black forming zone. The carbon black containing smoke leaving the first carbon black forming zone thus is an "active" stream under carbon black forming conditions when it enters the second carbon black forming zone.

The quenching of the total carbon black containing smoke which leaves the second carbon black forming zone is done in a conventional manner. Examples for quench fluid are water, steam, cooled carbon black containing gas, or smoke, and the like.

The general operating conditions in the two carbon black forming zones are conventional and need no further detailed description. Usually the following conditions will prevail in both sections:

| | |
|---|---|
| Temperature: | 2400 to 2800° F. |
| Air/Oil Ratio | 400 to 1200 SCF/gallon |
| Air/Fuel Ratio: | 0.8:1 to 2.5:1 stoichiometrics[a] |

[a]volume of air-to volume of methane of about 10-to-1 is a stoichiometric ratio of "1:1".

In accordance with another embodiment of this invention a carbon black furnace is provided. This carbon black furnace consists essentially of two carbon black reactors which are in axial alignment in open communication with each other. Each of the carbon black reactors has a precombustion section, a reaction section, hydrocarbon inlet means, and hot combustion gas inlet means. The downstream end of the reaction section of the first carbon black reactor is connected with the upstream end of the precombustion section of the second carbon black reactor.

The carbon black that preferably is produced in accordance with a process of this invention and in the apparatus of this invention is described in more detail in U.S. Pat. No. 4,071,496. The carbon black has a tint residual which is negative, particularly a tint residual of $-5$ or less. The tint residual is a property of the carbon black defined by the following formula:

$$TR = T - [56.0 + 1.057\,(CTAB) - 0.002745\,(CTAB)^2 - 0.2596\,(C\text{-}DBP) - 0.201\,(N_2SA - CTAB)].$$

In this formula, the abbreviations used have the following meanings and the properties are measured as described:

TR: This is tint residual.

CTAB: This is the surface area of the carbon black measured, in accordance with ASTM Method D 3765-79, m$^2$/gm.

N$_2$SA: This is the surface area of the carbon black measured using nitrogen in accordance with the ASTM method D-3037-71T, m$^2$/gm.

C-DBP: This is the structure of the carbon black in CC/100 g and is measured in accordance with ASTM method D3493-79.

T: This is the tint or tinting strength of the carbon black measured by arbitrarily assigning the reference black the value of 100; the tint is measured in accordance with ASTM 3265-75.

Among the carbon black defined by the formula given above, those that are further characterized by having surface area and structure properties within the following ranges are particularly preferred:

CTAB: 73 to 140 square meters/gram
C-DBP: 67 to 115 cc/100 g
(N$_2$SA - CTAB): 23 square meters/gram or less. All these properties, namely CTAB, C-DBP and N$_2$SA, are defined and measured as disclosed above.

For best overall performance in rubber compositions, a carbon black as defined above is presently preferred that has a tint residual TR as defined of $-5$ to $<20$.

Preferably, the means for introducing hot combustion gases into the precombustion sections comprise tangential inlets for the hot combustion gases such as to permit the generation of a tangential flow of hot combustion gases. The hydrocarbon inlet means for the first carbon black reactor preferably is a hydrocarbon discharge nozzle for essentially axially discharging the hydrocarbon feedstock. The hydrocarbon inlet means for the second reactor preferably comprises a plurality of hydrocarbon discharge nozzles positioned at the circumference of the furnace at the inlet to the precombustion section of the second reactor.

Further details of the reactor will become apparent from the following description of the drawing showing a schematic cross section through this reactor.

Low tint residual carbon black is produced in a double vortex flow oil furnace reactor shown in the drawing. A first enlarged vortex flow zone 14 is provided for. Into this first vortex flow zone 14 hot combustion gases are discharged peripherally and tangentially via inlet openings 20, the air and fuel being charged via lines 16 and 18. The feedstock is axially discharged into the reactor at the upstream end of the vortex flow zone 14 from line 10. Optionally, free oxygen containing gas, preferably oxygen or oxygen enriched air, is introduced via a jacket line 12 surrounding the feedstock line 10 to increase the structure of the carbon black formed in the carbon black reactor number 1. A converging carbon black reaction zone 22 is in open communication with the downstream end of the first vortex zone 14. The term "converging" refers to the main flow in axial direction in the furnace. The smaller downstream end of the first reaction or carbon black forming zone 22 is in open communication with a second enlarged vortex flow zone 28. Into this second enlarged vortex flow zone 28 hot combustion gases are similarly introduced via inlet ports 34, having associated therewith a conduit 30 for air and a conduit 32 for fuel introduction. By means of lines 24 and/or 26 a second stream of hydrocarbon feedstock is introduced into the second carbon black reactor 2. The discharge direction of the second hydrocarbon feedstock stream is usually in radial direction. Together with the second hydrocarbon feedstock a structure reduction material, preferably a potassium compound, is optionally introduced from line 40.

The downstream end of the second vortex flow zone 28 is connected with a diverging second carbon black forming zone 36. Again, the term "diverging" refers to the main axial flow of the carbon black forming mixture. Thus, the smaller end of the second carbon black forming zone 36 is connected to the wide second vortex flow zone 28. An outlet zone 38 which is cylindrically shaped follows the second carbon black forming zone 36 and this zone contains quench means 39 which quench fluid cools the mass flowing in 38 to below the temperature where carbon black production or formation occurs.

The tapering angle of the converging reaction zone 22, a, and the tapering angle of the diverging reaction zone 36, b, are preferably in the ranges shown in the following table:

TABLE

| Tapering angle a, degrees | 10 to 30 |
|---|---|
| Tapering angle b, degrees | 5 to 20 |

The following example is intended to further help understanding of the invention without undue limitation of the scope thereof.

EXAMPLE

The following tabulation gives calculated operating conditions based on typical carbon black forming operations. The reference numerals in parenthesis refer to the drawing.

| | | |
|---|---|---|
| (10) | Feedstock Hydrocarbon: | |
| | BMCI, | 125 |
| | Gallons/Hr., | 260 |
| | Boiling Range, °F., | 600 to 1200 |
| | Temperature, °F., | 450 |
| (12) | Oxygen: | |
| | SCF/Hr. | 3000 |
| (16) | Tangential Air: | |
| | SCF/Hr., | 160,000 |
| | Temperature, °F., | 800 |
| (18) | Tangential Fuel (CH$_4$): | |
| | SCF/Hr., | 10,000 |
| | Temperature, °F., | 90 |
| (24) | Feedstock Hydrocarbon: | |
| | BMCI, | 95 |
| | Gallons/Hr., | 180 |
| | Boiling Range, °F., | 600 to 1200 |
| | Temperature, °F., | 450 |
| (40) | KCl: | |
| | (a) to effect 50 ppm by weight K$^+$ in the feedstock (24). | (a) 0.15 lb/hr |
| (30) | Tangential Air: | |
| | SCF/Hr., | 90,000 |
| | Temperature, °F., | 800 |
| (32) | Tangential Fuel (CH$_4$): | |
| | SCF/Hr., | 6,000 |
| | Temperature, °F., | 90 |
| Reactor Pressure at (20), psig., | | 9 |

| | Range | Specific |
|---|---|---|
| Diameter of (14), inches | 24 to 40 | 30 |
| Length of (14), inches, | 6 to 12 | 10 |
| Diameter Inlet of (22), inches, | 15 to 30 | 22 |
| Diameter Outlet of (22), inches, | 6 to 14 | 8 |
| Angle (a), degrees, | 10 to 30 | 20 |
| Diameter of (28), inches | 20 to 40 | 30 |
| Length of (28), inches, | 4 to 12 | 8 |
| Diameter Inlet of (28), inches, | 6 to 14 | 8 |
| Diameter Outlet of (28), inches | 4 to 12 | 8 |
| Length of (36), inches, | 10 to 40 | 20 |
| Diameter of Inlet of (36), inches | 4 to 12 | 8 |
| Diameter of Outlet of (36), inches, | 10 to 30, | 15 |
| Angle (b), degrees, | 5 to 20 | 10 |

Reasonable variation and modifications which will become apparent to those skilled in the art can be made in this invention without departing from the spirit and scope thereof.

I claim:

1. Process for producing carbon black of negative tint residual by pyrolytic decomposition of hydrocarbons in a carbon black furnace, comprising
   (a) establishing a first flow of hot combustion gases formed by the combustion of a first fuel stream and a first oxygen containing stream,
   (b) introducing a first stream of hydrocarbon feedstock into a first carbon black forming zone of said furnace and into admixture with said first flow of hot combustion gases to form a first carbon black forming mixture in which at least a portion of said first stream of hydrocarbon feedstock is converted to carbon black,
   (c) passing said first carbon black forming mixture from said first carbon black forming zone under carbon black formation conditions into a second carbon black forming zone of said furnace which is in open connection and fluid communication with said first carbon black forming zone,
   (d) establishing a second flow of hot combustion gases formed by the combustion of a second fuel stream and a second oxygen containing stream,
   (e) introducing a second stream of hydrocarbon feedstock into a second carbon black forming zone of said furnace and into admixture with said second flow of hot combustion gases and into admixture with said first carbon black forming mixture such as to form a second black forming mixture in which at least a portion of said second stream of hydrocarbon feedstock is converted to carbon black, (f) maintaining operation parameters in said first and said second carbon black forming zones such that in one of the carbon black forming zones, being a high structure zone, the hydrocarbon feedstock is converted into a high structure carbon black, and such that in the other carbon black forming zone, being a low structure zone, the hydrocarbon feedstock is converted into a low structure carbon black, (g) passing said second carbon black forming mixture from said second carbon black forming zone into a quench zone, (h) contacting said second carbon black forming mixture with a quench fluid to produce a carbon black containing smoke at a temperature below carbon black formation temperature, (i) separating carbon black of negative tint residual from said smoke as the product of the process.

2. Process in accordance with claim 1 wherein said high structure zone is said first carbon black forming zone.

3. Process in accordance with claim 1 comprising (a) introducing into said first zone a stream of high BMCI oil as said first stream of hydrocarbon feedstock, said stream being surrounded by a gas stream comprising up to 70 percent of the oxygen of the first oxygen containing stream, (b) introducing into said second zone a stream of low BMCI oil as said second stream of hydrocarbon feedstock and 10 ppm or more potassium as said structure reducing agent based on the quantity of low BMCI oil.

4. A process in accordance with claim 1 wherein the difference in BMCI of the hydrocarbon feedstock introduced into the high structure zone and the BMCI of the hydrocarbon feedstock introduced into the low structure zone is in the range of about 20 to 90.

5. A process in accordance with claim 1 wherein 10-70 percent of the total oxygen for the high structure zone is introduced in the form of one or more streams surrounding the stream of hydrocarbon feedstock to the high structure zone.

6. A process in accordance with claim 1 wherein the difference in the BMCI of the hydrocarbon feedstock introduced in the high structure zone and the BMCI of the hydrocarbon feedstock introduced into the low structure zone is in the range of about 20-90 and 10-70 percent of the total oxygen for the high structure zone is introduced in the form of one or more streams surrounding the stream of hydrocarbon feedstock to the high structure zone.

7. A process in accordance with claim 4 or 5 or 6 wherein an alkali metal as structure reducing agent is introduced into the low structure zone.

* * * * *